(12) United States Patent
McGehee

(10) Patent No.: US 7,207,415 B2
(45) Date of Patent: Apr. 24, 2007

(54) REMOVABLE TREE STAND SHUR LOK LATCH

(76) Inventor: Timothy R. McGehee, 914 Pine Valley Dr., El Dorado, AR (US) 71730

( * ) Notice: Subject to any disclaimer, the term of this patent is extended or adjusted under 35 U.S.C. 154(b) by 163 days.

(21) Appl. No.: 10/978,745

(22) Filed: Nov. 2, 2004

(65) Prior Publication Data
US 2006/0090962 A1 May 4, 2006

(51) Int. Cl.
A63B 27/00 (2006.01)
E04G 3/00 (2006.01)

(52) U.S. Cl. .................. 182/135; 182/187; 108/152; 297/217.1

(58) Field of Classification Search ........... 182/187, 182/188, 135, 136, 116, 20; 297/217.1; 108/152
See application file for complete search history.

(56) References Cited

U.S. PATENT DOCUMENTS

| | | | |
|---|---|---|---|
| 5,588,499 A | 12/1996 | Carriere | |
| 5,975,242 A | 11/1999 | Woller et al. | |
| 6,182,792 B1 * | 2/2001 | Woller et al. | 182/187 |
| 6,397,973 B1 * | 6/2002 | Woller | 182/187 |
| 6,523,642 B1 * | 2/2003 | Graham et al. | 182/136 |
| 6,568,505 B1 * | 5/2003 | D'Acquisto | 182/187 |
| 6,588,546 B1 * | 7/2003 | Forrest | 182/135 |
| 6,622,823 B2 * | 9/2003 | Engstrom | 182/136 |
| 6,668,976 B2 * | 12/2003 | Graham et al. | 182/136 |
| 6,698,549 B2 * | 3/2004 | Graham et al. | 182/136 |
| 6,715,585 B1 * | 4/2004 | Overbaugh | 182/187 |
| 6,722,472 B2 * | 4/2004 | Berkbuegler | 182/187 |
| 6,866,120 B1 * | 3/2005 | Butterworth | 182/187 |
| 6,942,064 B2 * | 9/2005 | Wolford | 182/136 |
| 6,948,589 B2 * | 9/2005 | Johnson | 182/136 |

* cited by examiner

Primary Examiner—Hugh B. Thompson, II

(57) ABSTRACT

A removable tree stand with a novel shur lok latch. A platform extends laterally outward from the tree in a nominally horizontal position. The platform end proximal to the tree includes a mechanism for engaging the tree. Integral tubular support arms project up at an angle from both sides of the platform to a height above the platform. A support cable, including a plurality of mechanical stops, encircles the tree trunk and is inserted through both tubular support arms. The first key feature is a novel pivoting cable engagement mechanism, called a shur lock latch, on each support arm that is easily engaged and provides a positive lock that prohibits inadvertent disengagement of the support cable in both the loaded and unloaded condition. A second key feature is that the support cable is powdercoated to provide increased durability.

6 Claims, 1 Drawing Sheet

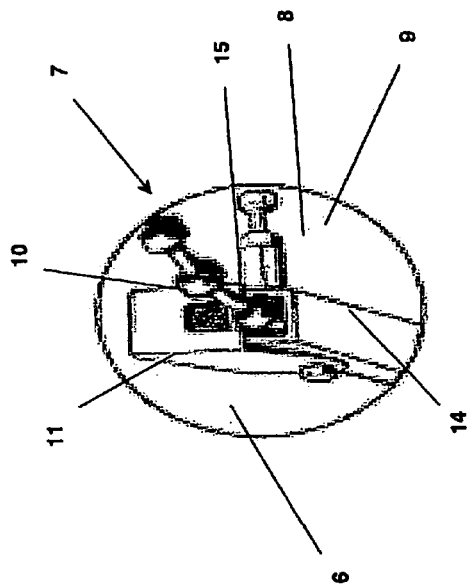
Fig. 2
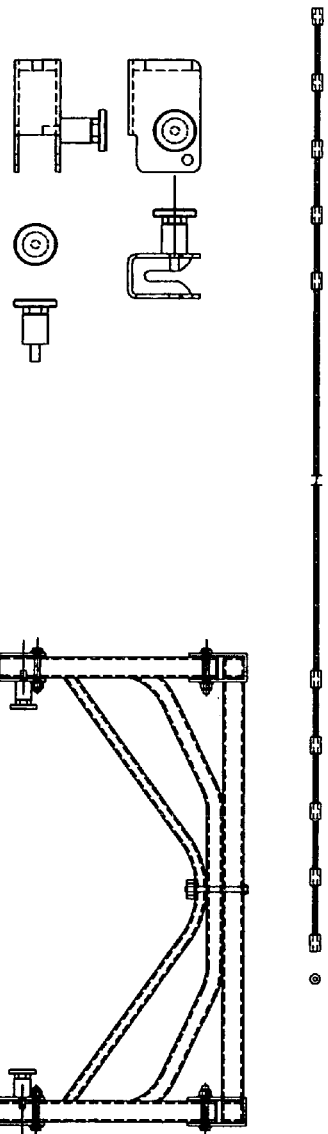
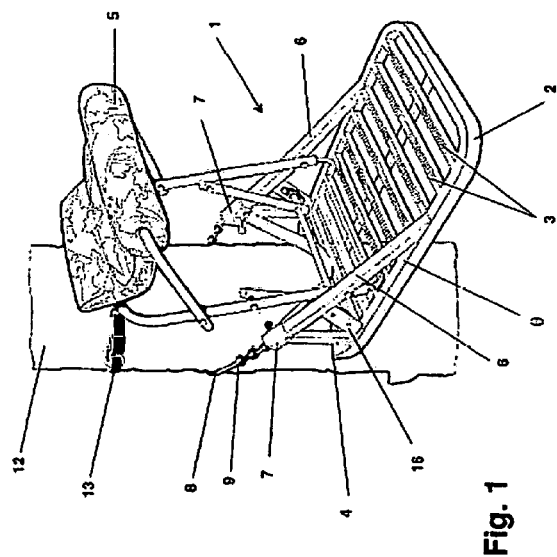
Fig. 1
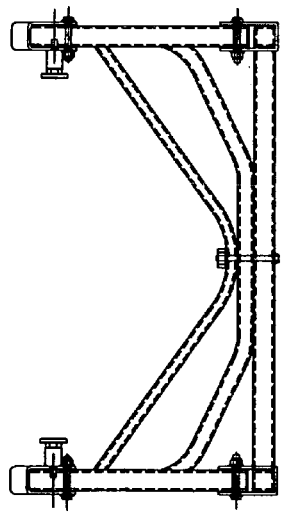

REMOVABLE TREE STAND SHUR LOK LATCH

BACKGROUND OF THE INVENTION

1. Field of the Invention

The present invention broadly relates to the field of hunting. Specifically, the invention relates to tree stands used by hunters and outdoorsmen to secure a seating position to an adjacent tree trunk.

2. Description of the Prior Art

Tree stands are commonly used by hunters and outdoorsmen to gain an advantageous elevated height relative to their quarry. The oldest of tree stands were semi-permanent fixed arrangements wherein a platform or other means was either permanently attached to the trunk of a tree or a substructure made of wood. These tree stands had the disadvantage that they were immobile. A hunter could not simply move a large structure in order to follow game.

Hence a variety of lightweight, portable, removable tree stands were developed. Recent examples include tree stands by Woller et al. (U.S. Pat. No. 5,975,242) and Carriere (U.S. Pat. No. 5,588,499). Such examples typically include a flat, horizontal platform upon which the subject sits, a means for engaging said platform to an adjacent tree trunk, and an adjustable means encircling the tree trunk. Such encircling means maintains said platform in the proper alignment once a load is applied by the seated subject.

One major problem with prior art tree stands is their ease of adjustment for trees of differing diameters. The tree stand of Woller et al. describes two different embodiments of cleats used to capture stops on an adjustable support cable. In the first embodiment, said cable must be over-extended until one of the cable stops can be inserted through a key-hole slot in the support frame. The cable must then be slightly removed (slackened) to engage the stop inside the support frame. The disadvantage is that cables are typically metallic and non-stretching in order to support the load of a subject. It is cumbersome to pull the support cable far enough to engage the stop into the keyhole slot. Moreover, the inherent slack in the support cable after engagement may permit the cable to disengage through the key-hole slot during positioning or other rough handling of the tree stand. A small movable cover partially closes the key-hole, but there is no positive locking means for retaining the stop while the tree-stand is in an unloaded condition.

In the second cleat embodiment of Woller et al., the adjustable cable and stops must be inserted through a pair of opposed U-shaped clips. The clips are wide enough to admit the cable but too narrow to admit the stops. The disadvantage of this system for stop engagement is again a product of the support cable. The support cable, being typically a multi-strand metallic core, is very rigid and does not easily lend itself to bending or flexing as required to engage the cleat of Woller et al. In view of the prior art, a means for engaging a support cable that does not require extensive manipulation of the support cable is required. Such a novel engaging means should also provide a definitive positive lock making inadvertent disengagement of the support cable impossible even during rough treatment of the tree stand assembly.

One final limitation of the prior art is the constitution of the support cable. Prior art cables typically comprise a stiff, multi-stranded metallic core, a series of mechanical stops, and an external layer. During production the mechanical stops are swaged or otherwise integrally and mechanically attached to the core. The integral assembly is then typically dipped or extruded through a plastic material such as polyethylene or a heat-shrunk material is applied. The resulting plastic external layer is meant both to protect the core and stops from corrosion and meant to facilitate moving the cable in and out of an engagement means. Unfortunately, the usual external layer material, typically a thermoplastic, is easily damaged by the very same engagement means. Over time, this damage becomes excessive and the cable must be replaced. Clearly a more robust external coating is required to increase the usable life of the cable.

SUMMARY OF THE INVENTION

The present invention is a tree stand with several key features. A platform extends laterally outward from the tree in a nominally horizontal position. The platform end proximal to the tree includes a means for engaging the tree. Integral tubular support arms project up at an angle from both sides of the platform to a height above the platform. A support cable, including a plurality of mechanical stops, encircles the tree trunk and is inserted through both tubular support arms. The first key feature is a novel pivoting cable engagement means, called the Shur Lok Latch, on each support arm that is easily engaged and provides a positive lock that prohibits inadvertent disengagement of the support cable in both the loaded and unloaded condition. A second key feature is that the support cable is powdercoated to provide increased durability.

BRIEF DESCRIPTION OF THE DRAWINGS

FIG. 1 shows an oblique view of the tree stand of the present invention.

FIG. 2 shows an oblique detail view of the shur lok cable engagement means of the present invention.

DETAILED DESCRIPTION OF THE INVENTION

With reference to FIGS. 1 and 2, tree stand 1 comprises several elements. Lightweight platform 2 is substantially planar in geometry. Platform 2 may comprise a solid surface, but preferentially platform 2 comprises a plurality of ribs 3 welded to an annular frame in order to save weight yet still provide mechanical strength.

The platform end proximal to the tree (tree 12 is for reference only) includes a means 4 for engaging the tree. Said tree engaging means 4 may comprise a single engaging member capable of a single tangential point of contact with the tree, or preferably said engaging means 4 may comprise a large V-shaped member capable of two tangential points of contact with the tree. Either tree engaging means 4 embodiment may employ teeth, spikes, roughened surface(s), or other means for assisting engagement of the tree surface.

An optional seat 5 may be attached to the top surface of platform 2. Alternatively, platform 2 may be used without optional seat 5, in which case the subject may sit directly upon platform 2. Optional seat 5 may be of any type common in the art. Typically, seat 5 will attach to platform 2 via a hinge. For added stability, seat 5 may be fastened directly to the tree with optional seat restraint 13.

Two integral tubular support arms 6, one attached to each side of platform 2, project up out of the major plane of platform 2, at an angle θ, towards the tree such that the proximal end of each support arm 6 is at a height above the platform. Support ribs 16, integral between platform 2 and each support arm 6, provide additional strength. Support arms 6 are preferably square or rectangular tube-shaped geometries although other geometries may be employed. Angle θ is typically in the range of between about fifteen degrees and about forty-five degrees.

Each tubular support arm 6 terminates at its proximal end with a cable securing means 7 called a shur lok. Cable securing means 7 attaches removably to cable 8. Cable 8 comprises a multi-strand steel core of substantially constant diameter. A plurality of cable stops 9 are permanently attached to the core of cable 8 by any means known in the art such as swaging, screwing, or other mechanical assembly. The maximum outer diameter of cable stops 9 can not exceed the minimum internal dimension of tubular support arm 6 so that cable 8 and cable stops 9 can freely slide inside support arm 6.

The entire cable and stop assembly is coated with a protective coating. In the preferred embodiment, this protective coating is powdercoating as with, for example, Polyarmor Extra Black by INNOTEK (INNOTEK part number G17SH101S70-40). Powdercoating provides superior durability against exposure and against abrasion caused by repeated engagement and disengagement with cable securing means 7. Powdercoating is one of the key features of the invention.

Cable securing means 7 is another key feature of the present invention. Cable securing means 7 comprises a rotating cable latch 10, a hinge 11, and a spring-loaded locking pin 14. In the preferred embodiment, rotating cable latch 10 has substantially the same planar-sided, box-like geometry as three sides plus the proximal, terminal end of support arm 6. A distal corner of cable latch 6 is connected near the terminal end of support arm 6 via hinge 11 such that in the closed position, cable latch 10 covers the proximal end of support arm 6 and contacts the sides of support arm 6. In the exemplary embodiment of FIG. 1 and FIG. 2, engaged cable latch 7 covers the top face, inside face, outside face, and proximal face of the terminal end of each support arm 6. Also in this embodiment, cable latch 10 can rotate up and away from the proximal face of support arm 6 into an open position. The axis of hinge 11 is parallel to the major plane of support platform 2.

The proximal face of cable latch 10 includes a slot 15 that is of sufficient diameter to permit cable 8 to slide freely in and out of support arm 6, but that is not of sufficient diameter to permit any of stops 9 to exit from inside of support arm 6.

The inside face of cable latch 10 includes an integral spring-loaded locking pin 14. In the closed latch position, pin 14 protrudes through a hole in the inside face of cable latch 10 and captures support arm 6. The spring tension is biased to retain pin 14 in this engaged position. By pulling a knob on locking pin 14 against the bias of the spring tension, a user can disengage the pin sufficiently to permit temporary free rotation of cable latch 10 between the closed and open positions. With locking pin 14 capturing support arm 6, cable latch 10 can not rotate out of the closed position.

In operation, locking pin 14 is disengaged, cable latch 10 rotated up and out of the way into the open position, and locking pin 14 is released. Next, a first end of cable 8, including at least one integral cable stop 9, is looped behind a tree trunk and inserted into the hollow proximal end of support arm 6. Locking pin 14 is again disengaged so that cable latch 10 can rotate down into the closed position. Slot 15 captures cable 8 and at least one cable stop 9 inside support arm 6. When locking pin 14 is engaged, cable 8 and stop 9 are integrally captured and can not be removed without deliberate disengagement of locking pin 14. This process is repeated on the second support arm to engage a second end of cable 8 in the second cable securing means 7. Tree stand 1 may now be employed by the subject.

Removal of tree stand 1 from the tree is straightforward. Locking pin 14 is disengaged, cable latch 10 is rotated up and out of the way into the open position, and locking pin 14 is released. Cable 8 slides freely from the terminal end of support arm 6 and tree stand 1 detaches from the tree. This process need not be repeated on the second support arm 6 to effect removal.

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What is claimed is:

1. A tree stand comprising:
   a platform;
   a tree engaging means;
   a cable comprising a multi-strand steel core of substantially constant diameter, a plurality of cable stops, and an external coating;
   two integral tubular support arms, one attached to each side of said platform;
   wherein each said support arm terminates at its proximal end with a cable securing means;
   wherein each said tubular support arms project up out of the major plane of said platform, at an angle θ, towards the tree such that the proximal end of each said support arm is at a height above said platform;
   wherein said cable securing means further comprises a rotating cable latch, a hinge, and a spring-loaded locking pin;
   wherein a distal corner of said cable latch is connected near the proximal end of said support arm via said hinge such that in a closed position, said cable latch covers a proximal end of said support arm and contacts sides of said support arm;
   wherein the proximal face of said cable latch includes a slot that is of sufficient diameter to permit said cable to slide freely in and out of said support arm, but that is not of sufficient diameter to permit any of said stops to exit from inside of said support arm;
   wherein an inside face of said cable latch includes said spring-loaded locking pin such that with said latch in the closed position, said locking pin protrudes through a hole in the inside face of said cable latch and captures said support arm; and
   wherein said locking pin disengages by pulling a knob against the bias of a spring to permit said cable latch to operate between an open position, wherein said cable and said stops may be introduced into an open end of said support arm, and a closed position, wherein said cable and said stops are captured by said slot.

2. A tree stand according to claim 1, wherein said tree engaging means comprises a large V-shaped member capable of two tangential points of contact with a tree.

3. A tree stand according to claim 1, further comprising a seat attached to a top surface of said platform via a hinge.

4. A tree stand according to claim 1, wherein said external coating comprises powdercoating.

5. A tree stand according to claim 1, wherein the angle θ is in the range of between about fifteen degrees and about forty-five degrees.

6. A tree stand according to claim 1, wherein said platform comprises a plurality of ribs welded to an annular frame.

* * * * *